D. BUCK.
Cooking Stove.
No. 174. Reissued Aug. 27, 1850.
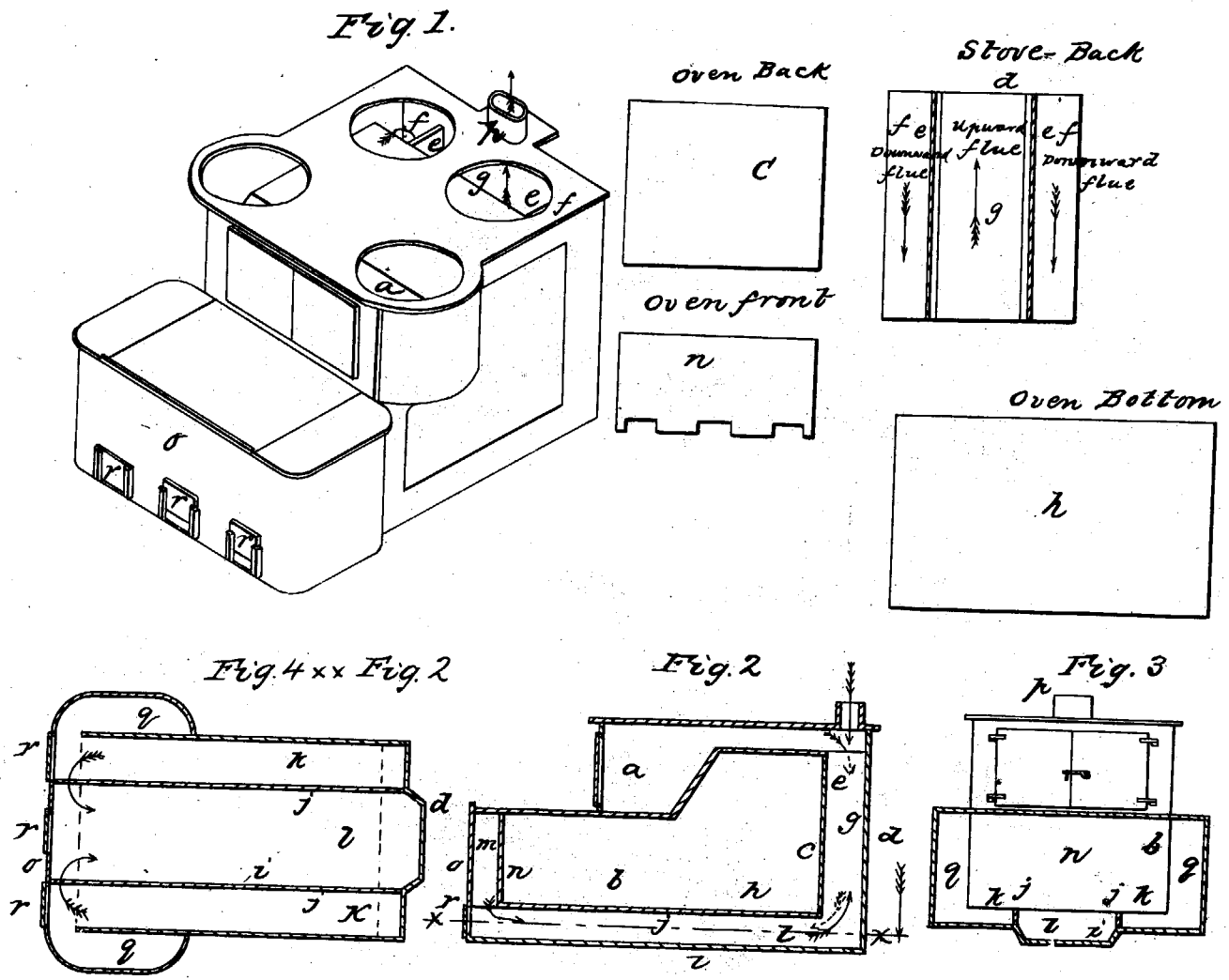
N. PETERS Photo-Lithographer, Washington, D. C.

UNITED STATES PATENT OFFICE.

DARIUS BUCK, OF ALBANY, NEW YORK; DESIRE BUCK ADMINISTRATRIX OF SAID DARIUS BUCK, DECEASED.

IMPROVEMENT IN COOKING-STOVES.

Specification forming part of Letters Patent No. 1,157, dated May 20, 1839; Reissue No. 174, dated August 27, 1850.

*To all whom it may concern:*

Be it known that I, DARIUS BUCK, of the city and county of Albany, and State of New York, have invented new and useful Improvements in Cooking-Stoves; and I do here by declare that the following is a full, clear, and exact description of the principle or character which distinguishes my invention from all other things before known, and of the manner of making, constructing, and using the same, reference being had to the accompanying drawings, making part of this specification, in which—

Figure 1 is a perspective view of my improved stove; Fig. 2, a longitudinal vertical section; Fig. 3, a cross-vertical section, and Fig. 4 a horizontal section taken at the line *x x* of Fig. 2; and the other figures represent separate views of the different plates constituting the stove.

The same letters indicate like parts in all the figures.

My improvements are based on that class of cooking-stoves sometimes known under the appellation of "Hathaway stove," in which the oven is below the fire-place and heated by an arrangement of direct and return flues, sometimes called "reverberating-flues," in which the products of combustion pass from the fire-place down two diving-flues at the back, then in two flues under the oven, and thence return through a flue between the two direct flues under and back of the oven, and escape into the chimney from the end of the return-flue. This arrangement of flues has the effect to equalize, or nearly so, the heat applied to a plate of metal; but although in a stove thus constructed an equal or nearly equal temperature can be applied to some of the plates of the oven, yet the oven does not bake equally, for the reason that the front plate of the stove is not heated except by the conducting properties of the metal; hence the oven receives more heat at the top, back, and bottom than it does at the front.

Prior to the date of my invention in this class of stoves the oven could not be advantageously enlarged relatively to the other parts of the stoves, for it extended under the open hearth or apron. To render available this otherwise waste room, the front plate of the oven would be thereby carried farther from the influence of the fire-place, and hence receive less heat by conduction than when placed in the same plane with the front of the fire-chamber.

In view of these facts the object of my invention was, first, to give an equal or nearly equal heat to the oven, the better to adapt it to baking equally; and, secondly, to enlarge the oven by extending it under the open hearth or apron and at the same time apply an equal or nearly equal heat to all its parts.

The first part of my invention consists in making a heating chamber or flue in front of the oven of this class of stoves, which heating chamber or flue communicates at bottom with the direct and return flues under the oven, so that the passage of the products of combustion through the direct flue into the return-flue will have the effect to produce a circulation of heat in the said heating-chamber and thus heat the front of the oven; and the second part of my invention consists in extending the oven under the open hearth or apron, to enlarge it proportionally to the other parts of the stove, when this is combined with the direct and return flues at the back and bottom of the oven and the heating-chamber in front of the oven, by means of which the enlargement of the oven is heated equally, or nearly so, and thereby rendered more useful by reason of baking more equally.

In the accompanying drawings, *a* represents the fire-place, which is placed on top of the oven, *b*, the top plate of which is the bottom of the said fire-place. At the back of the oven there is a flue-space formed between the back plate, *c*, of the oven and the back plate, *d*, of the stove, and this space is divided by two division-plates, *e e*, into three flues, the two side ones, *f f*, being diving-flues and the middle one, *g*, being a return-flue, and there is a like flue-space between the bottom oven-plate, *h*, and the bottom stove-plate, *i*, which is in like manner divided by division-pieces *j j* into three flues, *k*, *k*, and *l*, corresponding and communicating with the back flues, *f*, *f*, and *g*, and in front of the oven there is a heating-chamber, *m*, formed between the front plate, *n*, of the oven and the front plate, *o*, of the stove and extending from the open hearth to the flue space below the oven. From the foregoing it will be seen that the products of the combustion pass from the fire-place over the remaining portion of the top of the oven, down the two diving-flues, *f f*, along the two side bottom flues *k k*, around the ends of the division-pieces *j j*, and back through the return-flue under and back of the oven to the exit-pipe *p*, and that in being reverberated to pass around into the return-flue that the products of combustion will pass in part through the heating-chamber in front of the oven, and thus establish a circulation of heat in the said chamber to heat the front of the oven.

Heating-chambers *q q* may, if desired, be made at the sides of that part of the oven which is under the open hearth or apron and communicating at bottom with the flues *k k* under the oven, for the purpose of giving additional heat to this extended part of the oven.

For the purpose of cleaning, the front plate, *o*, of the stove is made with holes corresponding with the three flues under the oven, which holes are closed with sliding plates *r r r*.

For the purpose of giving the required capacity to the return-flue at the bottom and back, the bottom and back stove-plates, *i d*, are recessed, as shown in the drawings.

It will be obvious from the foregoing that the first part of my invention may be employed without the second part or extension of the oven under the open hearth or apron, although the enlargement of the oven in the combination described gives more baking-room, and hence for most purposes renders the stove more useful. It will also be obvious that the relative proportions of the various parts may be changed at pleasure without departing from the principle or character of my invention, which distinguishes it from all other things before known.

What I claim, therefore, and desire to secure by Letters Patent, is—

1. The heating-chamber in front of the oven, in combination with the arrangement of direct and return flues at the bottom and back of the oven, substantially as described, for the purpose of imparting an equal or nearly equal heat to the oven, as described.

2. In combination with the heating-chamber in front and the arrangement of direct and return flues at the bottom and back, substantially as described, the extension of the oven under the open hearth or apron of the stove, substantially as described, whereby the capacity of the oven is increased relatively to the other parts of the stove, and at the same time heated equally, or nearly so, as described.

DARIUS BUCK.

Witnesses:
J. I. JOHNSON,
NELSON SALSBURY.